Feb. 28, 1967  J. S. FINK  3,307,162
MAGNETIC ARTICLE ENCODING APPARATUS
Filed Oct. 30, 1961  5 Sheets-Sheet 4
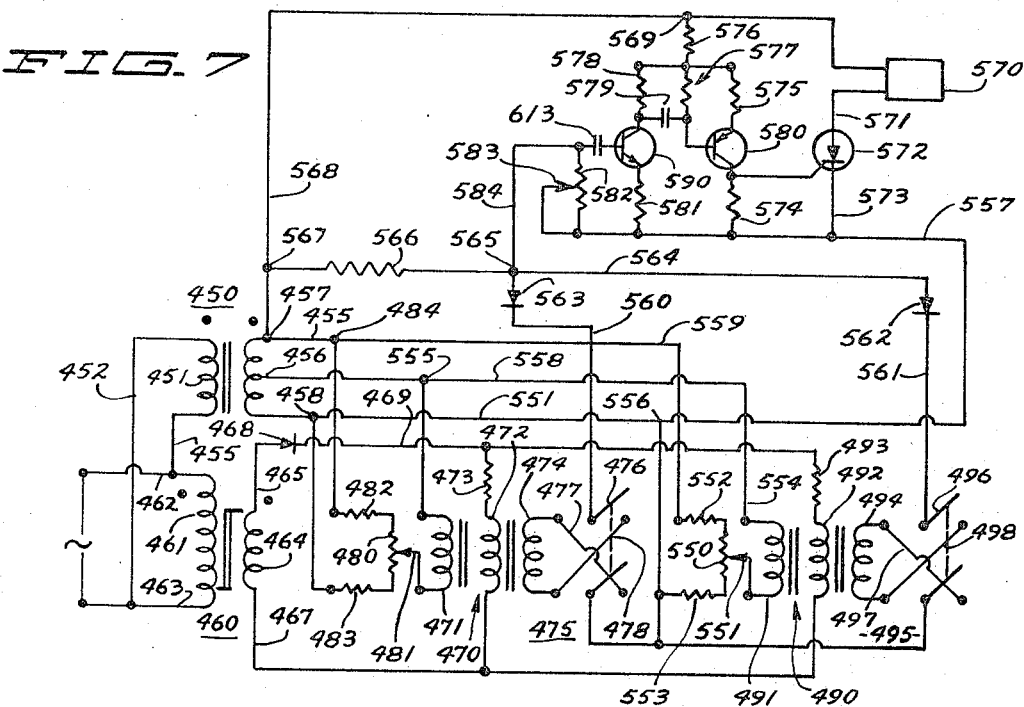
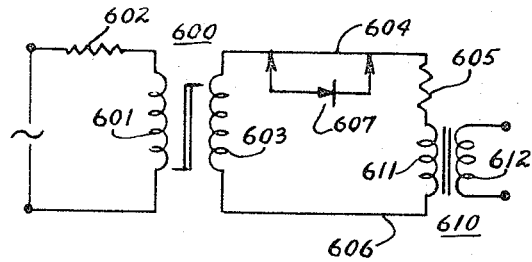
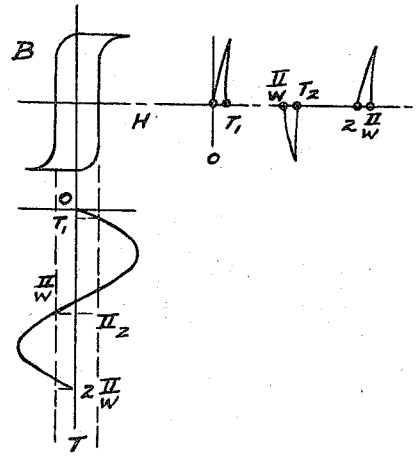
INVENTOR.
JAMES S. FINK
BY
Carlsen & Carlsen
ATTORNEYS Feb. 28, 1967 J. S. FINK 3,307,162
MAGNETIC ARTICLE ENCODING APPARATUS
Filed Oct. 30, 1961 5 Sheets-Sheet 5
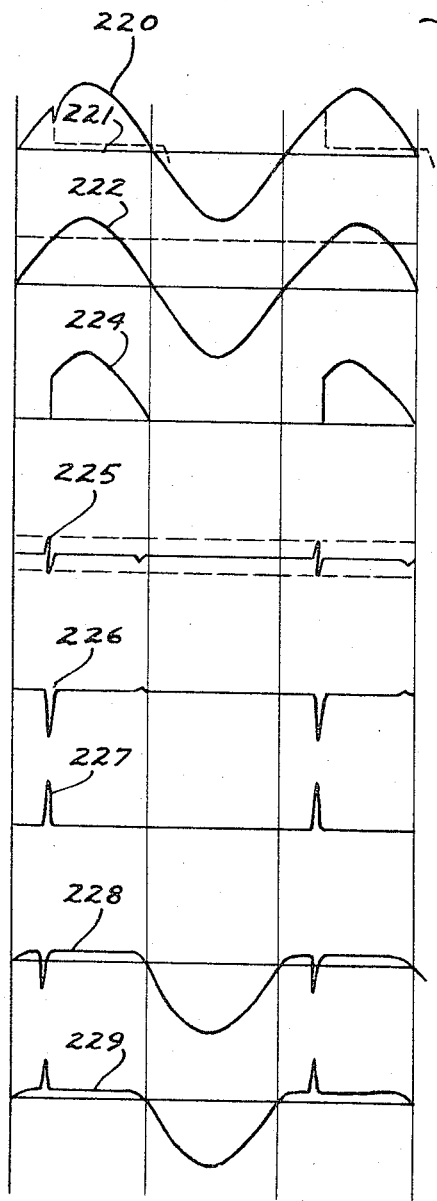
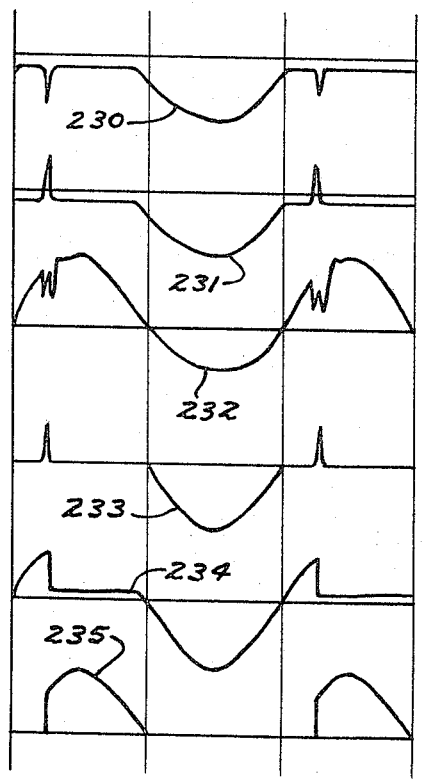
FIG. 5
INVENTOR.
JAMES S. FINK
BY
Carlsen & Carlsen
ATTORNEYS

United States Patent Office 3,307,162
Patented Feb. 28, 1967

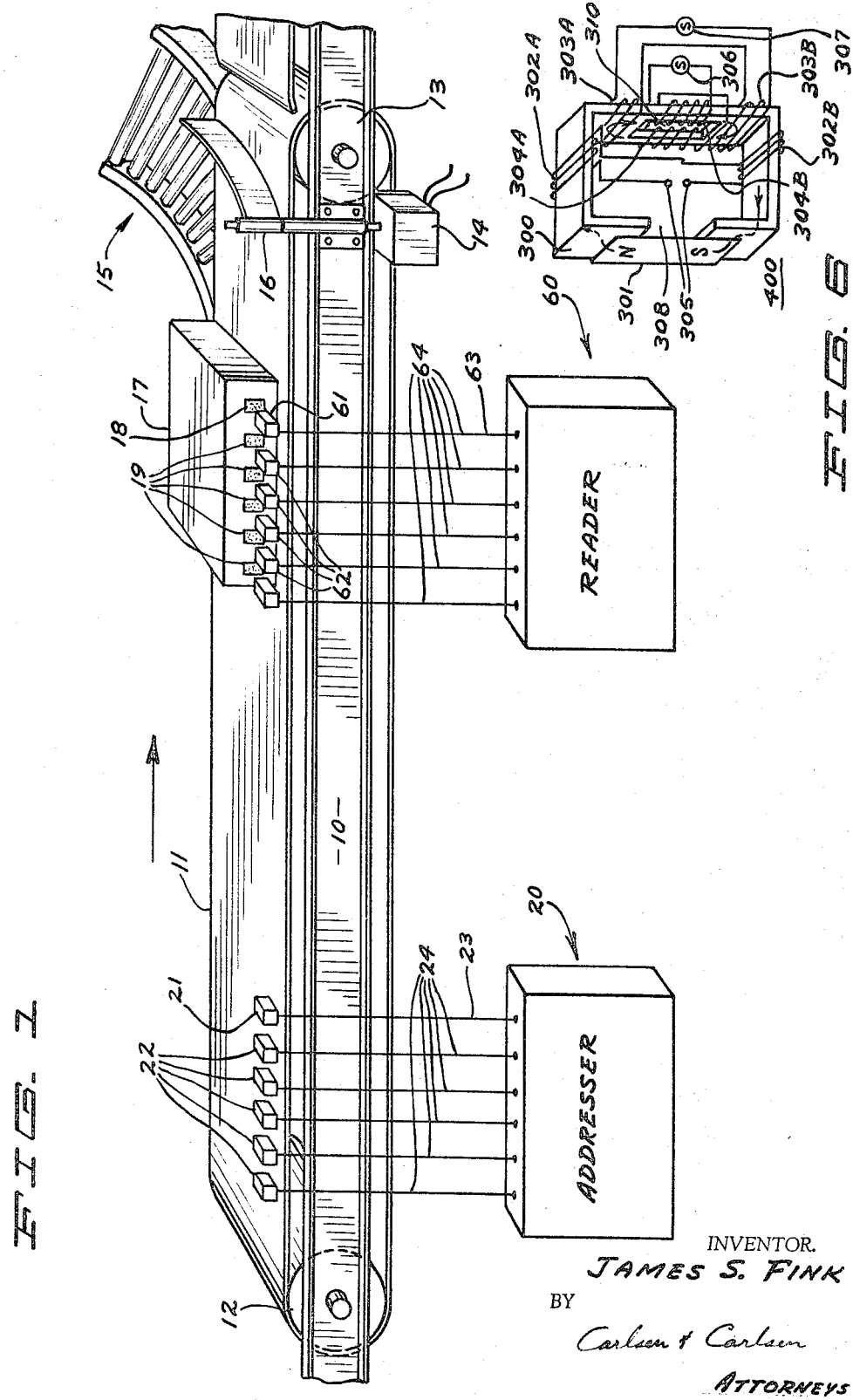

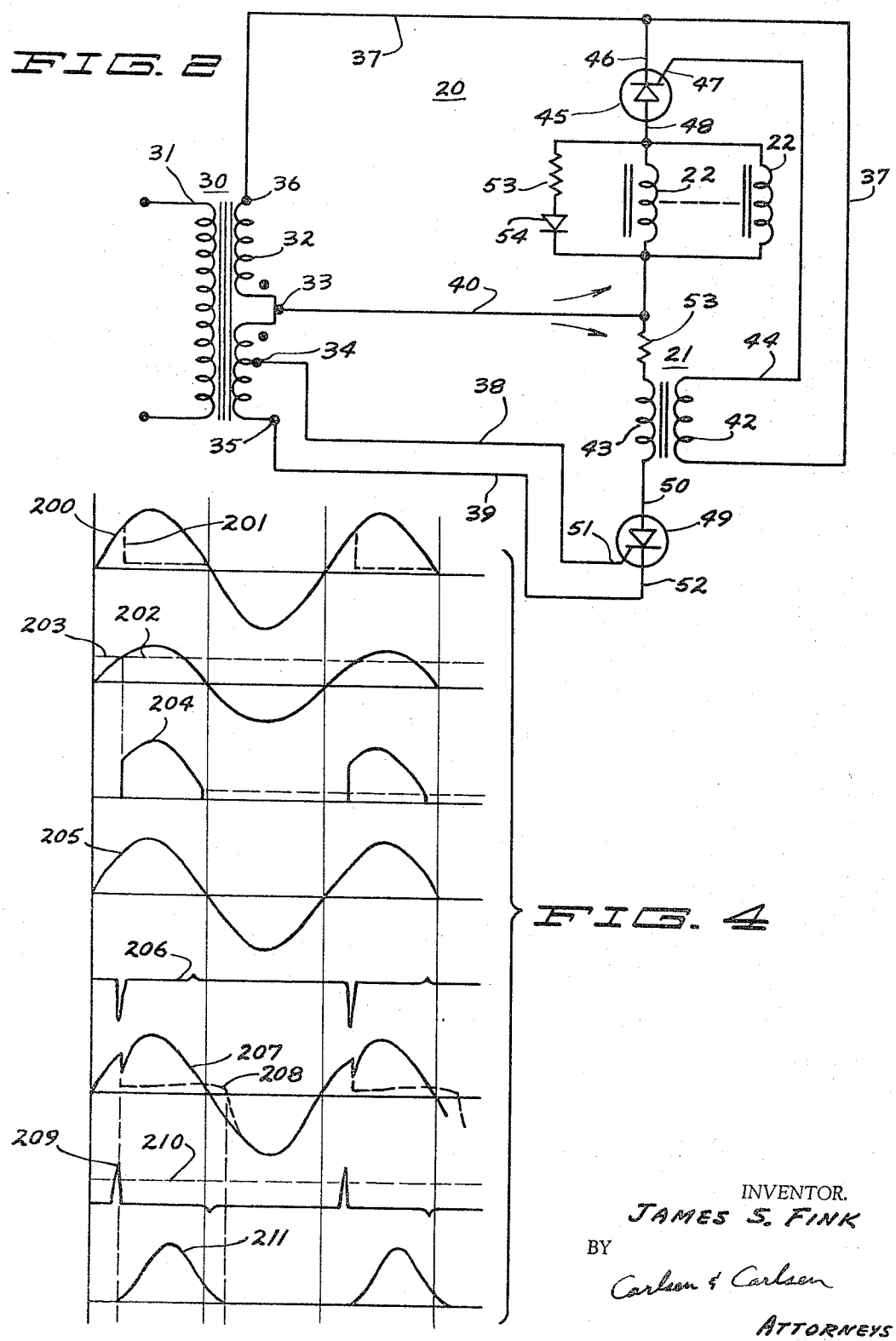

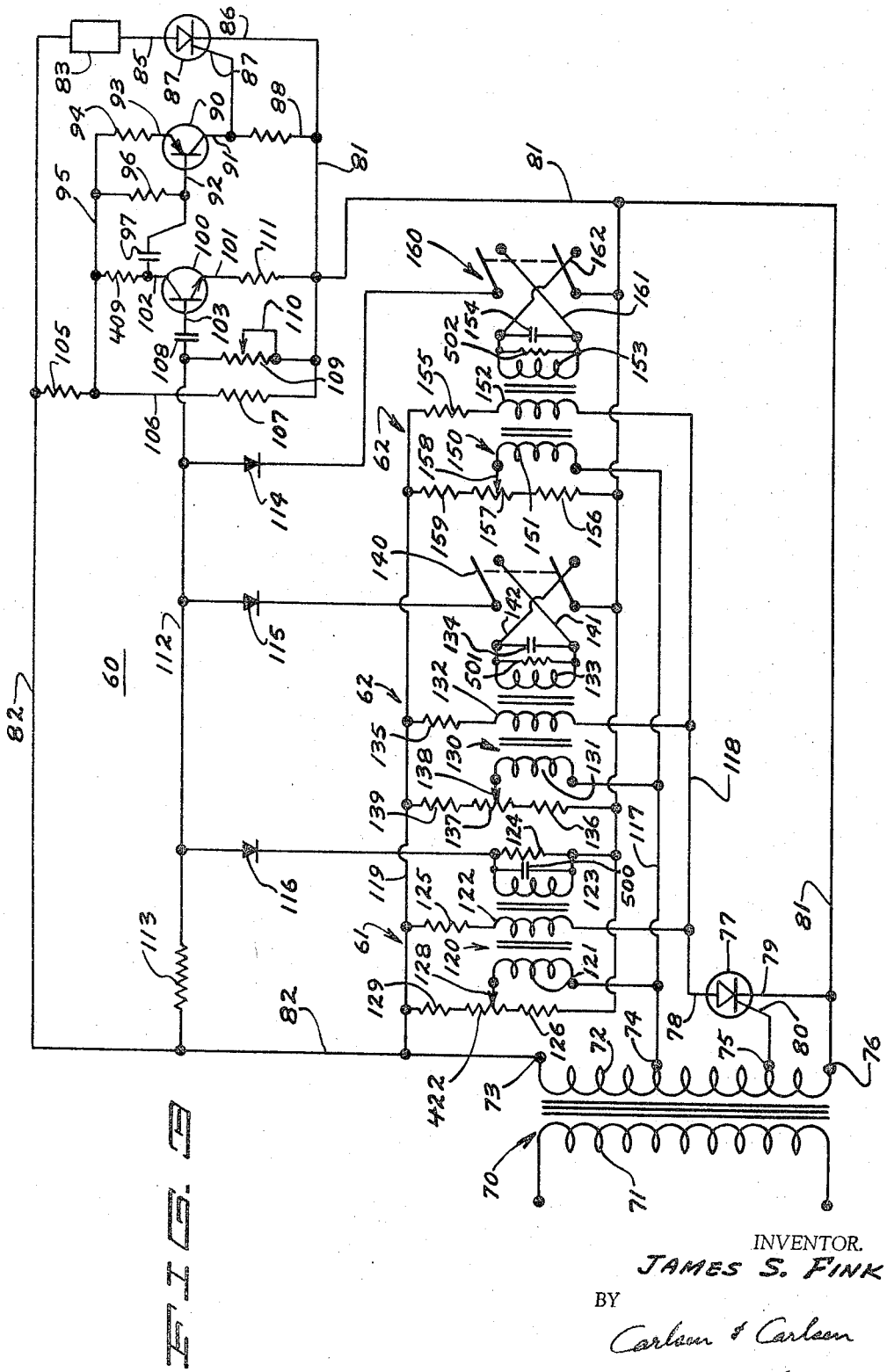

3,307,162
MAGNETIC ARTICLE ENCODING APPARATUS
James S. Fink, Minneapolis, Minn., assignor to The Electro Nuclear Systems Corporation, Minneapolis, Minn., a corporation of Minnesota
Filed Oct. 30, 1961, Ser. No. 148,564
13 Claims. (Cl. 340—174.1)

This invention relates generally to the field of control apparatus and is more particularly directed to control apparatus and devices for the conveying of articles from one location to certain predetermined locations of a plurality of remote stations.

An example of the prior art in the field in which the present invention relates is a conveyor system which may take the form of an elongated endless belt which may be driven by suitable driving means to convey articles from an input station positioned adjacent the conveyor at one end, to selected ones of a plurality of discharge stations positioned adjacent the conveyor at intervals along its line of travel. Formed integrally or attached to the conveying belt is a magnetizable medium which, by definition, will travel along the length of the conveyor mechanism in a constant positional relationship with an article placed on the conveyor mechanism and belt. In operation, an article may be placed on the belt at the input station and simultaneously a code corresponding to a particular discharge station may be magnetically recorded on the magnetizable portions of the belt at a predetermined posititon with respect to the article. Further travel of the article and the magnetically coded areas of the belt will provide sensing equipment at each of the discharge stations with an opportunity sense, or to "read," the coded signal on the belt. When a particular station senses a code corresponding to its location, appropriate diverting, or discharge mechanism serves to remove the article from the conveyor and it will come to rest at the desired location.

The present invention provides an improved arrangement in which magnetizable areas are utilized as provided on articles or article carriers to be placed on a conveyor mechanism at an input or address station and a suitable code magnetically transferred, or recorded, on the magnetizable areas for identification by remotely located discharge stations. In this manner, the precise positional relationship between the identifying code and the article, necessary in the above noted example of the prior art, is not required. The present invention further provides highly versatile apparatus for the operation thereof in which accurate, efficient and dependable operation is obtained. In one embodiment a common source of alternating current energy may be directly utilized to provide suitable operation.

In practicing one embodiment of the present invention, a means of sensing a magnetically recorded signal is utilized. In some cases a dynamic sensing may be employed, in the usual case static sensing means are employed as the coded signal will be recorded in such a direction with respect to relative movement of an article and the sensing means that sensing by other than static means will be undesirable. One device for statically sensing magnetic flux utilized a "flux gate" principle in which unbalance of a pulsed magnetic circuit caused by a source of magnetic flux is used to provide a usable output signal. It has been observed that an undesired output signal may occur where variations in ambient magnetic fields are encountered, thereby reducing the usefulness of this type of sensing device without complicated circuit arrangements for eliminating this effect.

The present invention provides a practical solution to this problem through the use of an adjustable source of magnetic flux applied directly to the sensing device.

It is therefore an object of the present invention to provide a new and improved control system for automatically conveying articles from one location to one of a plurality of remote stations.

It is a further object of the present invention to provide control apparatus for an article conveying system which is dependable and accurate.

It is a still further object of the present invention to provide control apparatus and equipment for article conveying systems which provides increased tolerances and latitude of operation.

Another object of this invention is to provide a method and apparatus for eliminating the effect of variation in ambient magnetic fields.

A further object of this invention is to provide a control system and apparatus operable directly from a common source of alternating current energy.

These and other more detailed and specific objects will be disclosed in the course of the following specification, reference being had to the accompanying drawings, in which:

FIG. 1 is a perspective representation of an article conveying system;

FIG. 2 is an electrical schematic diagram of the addresser portion of the apparatus of FIG. 1;

FIG. 3 is an electrical schematic reader portion diagram of the apparatus of FIG. 1;

FIG. 4 is a family of curves illustrating the operation of the circuit of FIG. 2;

FIG. 5 is a further family of curves illustrating the operation of FIG. 3;

FIG. 6 is a perspective representation of an improved electromagnetic energy transferring device;

FIG. 7 is an electrical schematic drawing of a further embodiment of my invention;

FIGS. 8 and 9 are an electrical schematic diagram and graph illustrating the operation of the embodiment of FIG. 7;

FIG. 10 is a further embodiment of a recording head as used in FIG. 1;

Referring now to the drawings, there is shown, in FIG. 1, a conveyor mechanism 10 which is comprised generally of an endless belt which passes around pulley drive members 12 and 13 positioned at opposite ends of the conveyor frame work. Either or both of drum members 12 and 13 may be driven from suitable driving means (not shown). At the left end of the conveying apparatus is a diverter, or discharge station, which includes a diverting mechanism 16, which may be of the type well known in the art movable between a position for engaging an article carried on the conveyor and causing it to move off of the conveyor or to a position which will not interfere with the forward movement of an article being conveyed. Suitable operating means for the diverting member 16 are normally housed in the block 14 and may be any one of the electrical, pneumatic or hydraulic mechanisms commercially available for positioning diverter member 16 in accordance with an electrical input signal. A pair of conductors for energizing this device are shown and would, in operation, be connected to the output of the reader indicated generally by the reference character 60. A second discharge conveyor apparatus 15 is positioned adjacent the edge of the primary conveyor mechanism for receiving and further conveying articles discharged thereon.

An article 17 having magnetizable elements, or members 19 and magnetic member 18 positioned on one side is shown carried by the conveyor apparatus and in signal transferring relationship with the apparatus of reader 60 which in turn may be connected, through connections not shown, to the operating mechanism 14 for diverters 16.

The reader, or discharge station 60, is provided with a plurality of electromagnetic energy transferring devices 62, connected through suitable conductors 64. A further electromagnetic energy transferring device 61 is also connected to reader 60 through suitable conductors 63. At the left end of the conveyor mechanism 10 is shown an addresser 20 which has a like plurality of electromagnetic energy transferring devices 22 connected through appropriate conductors 24 and a further electromagnetic energy transferring device 21 connected to addresser 21 through suitable conductors 23. It may be noted that the electromagnetic energy transferring devices are positioned adjacent the edge of the conveying apparatus 10 and are positioned with respect to one another to correspond generally to the spacing between the magnetizable elements 18 and 19 carried by the article to be conveyed so that relative movement between the article and the addresser or any one of a plurality of discharge, or reader stations will allow simultaneous transferring of energy so as to allow dependable operation of the system.

While the equipment for providing the input, or dispatching operation in the system is indicated generally by the block identified as addresser 20, it will be clear to one skilled in the art that suitable ancillary equipment, not shown, may be utilized to operate the addresser such that the necessary address codes may be applied to an article to be conveyed at the discretion of an operator for delivery of the article to the selected discharge location. For example, a keyboard having appropriately numbered keys and suitable circuitry may be utilized to connect the proper electromagnetic energy transferring devices 22 to provide various address codes for magnetizable members 19 on article 17 which may be detected by the reader 60 at various discharge locations. Addresser 20 and reader 60 may be connected to a suitable source of alternating current energy (not shown).

FIG. 2 includes a transformer 30 having a primary winding 31 with appropriate terminals for connection to a suitable source of alternating current energy and a composite secondary winding 32 including terminals 36, 33, 34, and 35 and wound as indicated by the polarity markings or dots applied adjacent terminals 33. A current controlling device, which may take the form of a silicon controlled rectifier, 49, includes anode electrode 50, a gating electrode 51 and a cathode electrode 52. Electrodes 51 and 52 may be considered as input electrodes and are connected to terminals 34 and 35 on transformer winding 32 through leads 38 and 29 respectively. Electrode 50 is connected to terminal 33 on secondary winding 32 through winding 43 on electromagnetic energy transferring device 21 through resistor 53 and lead 40. A further current controlling device 45, of similar characteristics to rectifier 49, includes electrodes 46, 47 and 48. Input terminals, or electrodes, 46 and 47, are connected to winding 42 on electromagnetic energy transferring device 21 through leads 37 and 44 respectively. Electrode 46 of silicon controlled rectifier 45 is connected to terminal 36 on secondary winding 32 through lead 37. Electrode 48 is connected to terminals 33 on secondary winding 32 through lead 40 and a plurality of electroresponsive energy transferring devices 22, having resistor 53 and asymmetrical current conducting device 54 connected in parallel therewith.

The top three curves in the family of curves shown in FIG. 4 relate to silicon controlled rectifier 49 while the lower five curves relate to silicon controlled rectifier 45, in either case the waveforms are referenced to the emitter electrodes 52 and 46 respectively.

FIG. 3 is a schematic representation of the apparatus indicated generally by the reference numeral 60 in FIG. 1. A transformer 70 includes a primary winding 71, adapted for connection to a suitable source of alternating current energy, and a secondary winding 72 having a plurality of terminals, 73, 74, 75 and 76. A current controlling device 77 (which may take the form of a silicon controlled rectifier) includes an anode electrode 78, a trigger electrode 80 and a cathode electrode 79. Electrodes 79 and 80 may be considered as input electrodes and electrodes 78 and 79 may be considered as output electrodes. A plurality of electromagnetic energy transferring devices are indicated generally by reference numerals 61 and 62 corresponding to the elements shown in FIG. 1. The right-hand device of this character is indicated generally by the reference numeral 150 and includes windings 151, 152 and 153. Winding 153 has a capacitor 154 and resistor 502 connected in parallel therewith and is in turn connected to appropriate stationary contacts of a double pole, double throw switch indicated generally by the reference number 160. Correspondingly opposite stationary contacts of switch 160 are interconnected by conductors 161 and 162 to provide a reversing switching function. The center electromagnetic energy transferring device is indicated generally by the reference numeral 130 and includes windings 131, 132 and 133. A capacitor 134 and resistor 501 are connected in parallel with winding 133 which is in turn connected to a double pole, double throw switch indicated generally by the reference numeral 140. Corresponding stationary contacts on switch 140 are interconnected by conductors 141 and 142 to provide reversing operation. The left hand electromagnetic energy transferring device is indicated generally by the reference character 120 and includes windings 121, 122 and 123. A resistor 124 and capacitor 500 are connected in parallel with winding 123. Electrode 80 on current controlling device 77 is connected to terminal 75 on secondary winding 72 and electrode 79 on current controlling device 77 is connected to terminal 76 on transformer winding 72. Electrode 78 on current controlling device 77 is connected to terminal 73 on secondary winding 72 through the following parallel paths; conductor 118, winding 122, resistor 125, conductor 119 and conductor 82; conductor 118, winding 132, resistor 135, conductor 119 and conductor 82; and conductor 118, winding 152, resistor 155, conductor 119 and conductor 82. A plurality of parallel current paths may be traced from terminals 73 to the terminal 76 on transformer winding 72 as follows: conductor 82, conductor 119, resistor 129, potentiometer winding 122 having a wiper 128 associated therewith, resistor 126 and lead 81; conductor 82, conductor 119, resistor 139, potentiometer winding 137 having wiper 138 associated therewith, resistor 136 and conductor 81; and conductor 82, conductor 119, resistor 159, potentiometer winding 157 having wiper 158 associated therewith, resistor 156 and conductor 81. Terminal 74 on transformer winding 72 is connected to wiper 128 on potentiometer 122 through lead 117 and winding 121. Terminal 74 is further connected to wiper 138 on potentiometer 137 through conductor 117 and winding 131. Terminal 74 is also connected to wiper 158 on potentiometer 157 through conductor 117 and winding 151. Terminal 73 on secondary winding 72 is connected to terminal 76 through lead 82, resistor 113 and through three parallel paths including conductor 112, asymmetrical current conducting devices 116, 115, 114 and winding 123, switch 140 and switch 160 and conductor 81.

As will be seen presently, the combined outputs of the electromagnetic energy transferring devices will appear on conductor 112 and this signal may be applied to an amplifier which includes a current controlling device 100 and a further current controlling device 90. Current controlling device 100, which may take the form of an NPN transistor includes a base electrode 103, a collector electrode 102 and an emitter electrode 101. Current controlling device 90, which may be a PNP transistor, includes a base electrode 92, a collector electrode 91 and an emitter electrode 93. A biasing and current supply for current controlling device 100 may be traced from terminal 73 on transformer winding 72 to terminal 76 thereon through a circuit including conductor 82, resistor 105, conductor 106, resistor 107, and conductor 81. Collector electrode 102 is connected to resistor 105 through resistor 409 and conductor 95. Emitter electrode 101 of current controlling device 100 is connected to conductor 82 through resistor 111. Base electrode 103 is connected to conductor 112 through capacitor 108. Conductor 112 is connected to conductor 81 through potentiometer 109 having a wiper 110 associated therewith. Emitter electrode 93 of current controlling device 90 is connected to resistor 105 through resistor 94 and conductor 95. Base electrode 92 is connected to resistor 105 through conductor 95 and to collector electrode 102 to capacitor 97. Collector electrode 91 is connected to lead 81 through resistor 88. A further current controlling device 87, which may take the form of a silicon controlled rectifier, includes an anode electrode 85, a trigger electrode 87 and a cathode electrode 86. Cathode electrode 86 is connected to lead 81. Trigger electrode 87 is connected to collector electrode 91 on current controlling device 90. Anode electrode 85 is connected to terminal 73 on transformer winding 72 through a load means 83, which may be part of the diverter actuating mechanism shown in FIG. 1 through conductor 82.

FIG. 5 contains a plurality of curves which will be explained in connection with the description of the operation of FIG. 3 below.

FIG. 6 is a perspective and diagrammatic representation of the electromagnetic energy transferring devices indicated generally by the reference numerals 21, 61 and 62 on FIG. 1 and schematically by the reference numeral 21 in FIG. 2 and 120, 130 and 150 on FIG. 3.

Electromagnetic energy transferring devices 22 may be of the type illustrated in FIG. 6 in which case windings 302A and 302B would be energized. Correspondence may be noted between the single winding shown schematically on FIG. 2 and windings 302A and 302B. It may be apparent to one skilled in the art that windings 303A, 303B, 304A and 304B may be omitted when the device is used for the purpose of encoding recording a magnetic signal. It may also be noted that the schematic representation of energy transferring device 21 on FIG. 2 includes a winding 43 corresponding to windings 304A and 304B and winding 42 corresponding to output windings 302A and 302B. In either case, the purpose and conditions of use of such device determines the windings necessary in normal operation. While the device shown in FIG. 6 may be suitably connected to perform in accordance with the above noted applications, certain of the windings may be omitted and the shape and core characteristics modified.

Electroresponsive energy transferring device 400 includes a frame constructed of magnetic material having substantially rectangular hysteresis characteristics and which, for example, is shown in the form of a rectangle having a rectangular opening formed in one leg as indicated by the reference character 310 and a gap in another leg as indicated by reference numeral 308. It may be recognized that the gap 308 is representative of a magnetic discontinuity in the material and it may therefore be comprised of suitable non-magnetic material. An output winding is comprised of windings 302A and 302B which are connected in series aiding relationship to a pair of output terminals 305 and is suitably wound upon core member 300 so as to be responsive to certain changes in flux occurring therein. A primary winding comprised of windings 304A and 304B is wound about the two parallel legs defined by the opening in one leg of the core member 300 and is electrically connected as to provide, upon energization, a closed loop of magnetic flux around the rectangular opening 310. A source of alternating current energy 306, is shown connected to the primary winding and may be of the type which provides a plurality of unidirectional pulses of energy at a predetermined frequency. A further winding, which may be utilized as a compensating winding, is comprised of windings 303A and 303B which are connected in series aiding relationship with a suitable source of alternating current energy 307. Source 307 may be of substantially the same frequency as source 306 and of variable magnitude and phase with respect thereto. A magnetic energy storage element 301 is shown in proximity to gap 308 with polarities as shown.

*Operation*

Reference is made to the left end of FIG. 1, FIG. 2 and family of curves illustrated in FIG. 4. In the present system, an article such as article 17 may be placed on the left hand end of conveyor 10. Article 17 includes a suitably polarized permanent magnet member 18 and a plurality of magnetizable elements 19 and may be positioned axially along one edge thereof. An operator will actuate a plurality of keys on a keyboard (not shown) which in turn serves to energize primary winding 31 from a suitable source of alternating current. A keyboard would include appropriately reversing switching means (not shown) but which may be of the type indicated in FIG. 3, so that the direction of the magnetic energy which will be produced upon energization of the devices 22, may be controlled in accordance with connections made by actuating devices operable from keys provided for use by the operator. Specific apparatus for providing the switching function for initially energizing the addresser 20 is not illustrated and may take one of many forms suitable for providing this function. Upon energization of the apparatus of FIG. 2, silicon controlled rectifier 49 is energized with approximately 6.3 volts R.M.S. across electrodes 50 and 52 and is simultaneously energized with approximately .8 R.M.S. across electrodes 51 and 52. It may thus be seen that pulses of uni-directional current are supplied to winding 43 of electroresponsive energy transferring device 21. It is recognized that element 21 may be of the same form as illustrated for the devices utilized in FIG. 3 and illustrated in FIG. 7. However, the compensating winding 303A–303B has been omitted for the sake of clarity and explaining the operation of this circuit. Curve 200 in FIG. 4 illustrates the supply voltage appearing across silicon controlled rectifier 49. The dotted curve 201 shows the anode voltage during conduction of rectifier 49. Curve 203 shows the level at which the silicon controlled rectifier 49 may be conductive and curve 202 illustrates the voltage applied across terminals 51 and 52 from transformer winding 32. Curve 204 shows the current flow through silicon controlled rectifier 49 in response to the above noted conditions. The dotted line appearing in conjunction with curve 204 illustrates the holding current or extinction current level characteristic of silicon controlled rectifier 49. Curve 205 shows the voltage appearing across silicon controlled rectifier 45 and curve 206, the voltage appearing across terminals 46 and 47 represents the output of winding 42 on electroresponsive energy transferring device 21 in response to the periodic energization thereof when there is no magnetic flux present. This operation will be continuous until such time as article 17 is conveyed into a position whereby magnet 18 is in proximity to element 21.

The magnitude of the voltage provided across the electrodes 51 and 52 of silicon controlled rectifier 49 and shown by curve 202 in FIG. 4 determines the time of conduction of rectifier 49 for each positive half cycle. The amount of conduction is arbitrarily shown as 135 electrical degrees.

Assuming a magnet having the polarities indicated on FIG. 7 is in proximity with element 21, the additional flux flowing through core 300 due to the magnet upon energization of primary winding 304A–304B is applied to output winding 302A–302B, corresponding to output winding 42, and a positive pulse (as determined by the connections to the output winding) is supplied to electrodes 47 and 46 of silicon controlled rectifier 45. The time of this pulse is approximately 45 degrees following the start of a positive half cycle of energization for rectifier 45.

Curve 207 in FIG. 4, illustrates the supply voltage across silicon controlled rectifier 45 and dotted curve 208 shows the voltage across rectifier 45 after it has been triggered into conduction. Curve 209 shows the pulse of energy supplied from output winding 42 on element 21 and curve 210 illustrates the firing level, or amplitude, necessary to trigger silicon controlled rectifier 45 into conduction. Curve 211 represents the current flow through rectifier 45 and through the plurality of record heads 22. Resistor 53 and asymmetrical current conducting device 54 are connected in parallel across recording heads 22 so as to eliminate possible undesirable effects due to transient energy occurring in this portion of the circuit. Since the recording heads may be energized in response to an output from winding 42 an address may be transferred to members 19 on article 17 such that each of the members 19 will have an axis of magnetic polarization which may, for instance, be vertical. The polarity may be with the top north and the bottom south and vice versa so that one polarity will indicate, for instance, a binary 1 and another polarity may indicate a binary 0. By utilizing suitable circuitry, the circuit in FIG. 2 may be de-energized after an address has been recorded. The absence of a positive going output across output winding 42 may be easily sensed and utilized to operate appropriate relay circuitry to disconnect the apparatus from the source of alternating current energy.

After an article, such as article 17, has been properly addressed, or encoded, it continues along the line of travel of conveyor 10 and may pass in proximity to one or more remotely positioned discharge or diverting stations similar to the example illustrated in FIG. 1. It will be noted that each of the stations may include a plurality of electromagnetic energy transferring devices of the type shown in FIG. 6 and schematically in FIG. 3. In FIG. 3, the double pole, double throw switch utilized in conjunction with the output windings of each of the code sensing electromagnetic energy transferring devices may be preset so that the output of the output windings will be of the same polarity regardless of the magnetic polarity of the elements mounted on article 17 when the code recorded on the elements 17 is "correct" for the address of a particular discharge or diverting station.

Referring specifically to FIG. 3, a primary winding 71 on transformer 70 may be energized from a suitable source of alternating current energy (not shown). It may be apparent to those skilled in the art that the source of alternating current energy utilized in the operation of the equipment of this system may be common to all of the equipment and it is anticipated that the commercially available 60-cycle alternating current will provide satisfactory operation under substantially all conditions in which equipment of this nature is required to operate.

Upon energization of the circuit of FIG. 3, silicon controlled rectifier 77 is provided with approximately 15 R.M.S. across electrodes 78 and 79 and approximately .8 volt R.M.S. across electrodes 79 and 80 so that a positive pulse of current is periodically applied to the primary windings of the electromagnetic energy transferring devices as shown by curve 224 in FIG. 5. Curve 220 illustrates the voltage across transformer secondary winding 72 as applied to silicon controlled rectifier 77 and curve 221 illustrates the votlage appearing at the anode electrode of silicon controlled rectifier 77. Again, the voltage applied to electrodes 79 and 80, as shown in curve 222, the time of conduction of rectifier 77 is approximately 135 electrical degrees for every positive half cycle.

It will be noted that each of the electromagnetic energy transferring devices, 120, 130 and 150 shown in FIG. 3, include an additional winding 121, 131 and 151 respectively. These windings are a schematic representation of what is referred to as a compensating winding on FIG. 7 as illustrated by the winding 303A–303B shown energized from a source of alternating current energy. In FIG. 3 the source is provided by a bridge arrangement in which one end of a winding, for instance, winding 121, is connected to a center tap 74 on secondary winding 72 and the other end of the winding is connected to wiper 128 on potentiometer 122 so as to provide a bridge and source of variable amplitude, reversible phase, alternating current.

The compensating winding is utilized to provide some degree of latitude in manufacturing tolerances and more importantly is utilized to allow for compensation for variations in any magnetic field likely to be encountered in normal use. For instance, it has been discovered that the earth's magnetic field varies considerably from one location to another in a geographical sense and that this may affect the operation of the type of transducing apparatus utilized in connection with the present invention. While the compensating winding is energized with full cycles of alternating current energy, since the transducing elements are, in effect, only turned on when energized from the output of rectifier 77, the half-cycle of the energy applied to the compensating winding occurring during conduction of the primary windings on the transducing elements is the one which will have any substantial effect on the operation of these devices. When energized, the compensating windings serve to add an additional flux around core member 300 in one direction or another and serves to balance out any net differences in the fluxes generated in winding 304A–304B so as to substantially reduce the likelihood of an output appearing across output terminals 305 which correspond to the output terminals on the output windings indicated on FIG. 3 as 123, 133 and 153 respectively. Curve 225 illustrates the form of an output voltage appearing across each of the output windings of code detecting heads 130 and 150 occurring at the initial conduction of rectifier 77 upon energizing the respective primary windings 132 and 152. Transducing element 120, corresponding to element 61 on FIG. 1 may further be adjusted to provide a distinct negative pulse of a relative amplitude illustrated by curve 226 on FIG. 5. It is noted that curve 225 shows pulse of a maximum amplitude of one volt.

The output windings of each of the transducer elements are connected to AND circuit or gate which includes resistor 113 and asymmetrical current conducting devices 114, 115, and 116. The ouput of the AND circuit, which is coupled to base electrode 103 of transistor 100 through capacitor 108, is illustrated by curve 228 on FIG. 5 which is a representation of this output when there is either no magnetic flux in proximity to any of the electroresponsive current transferring devices, or the "wrong" core is present. Curve 229 shows the output of the AND circuit when each of the transducer devices is in proximity to a source of magnetic flux having the proper polarity for which each of the transducer devices is conditioned to be responsive.

Curves 230 and 231 on FIG. 5 represent signals applied to the input of transistor 100 when an "incorrect" and "correct" code respectively has been sensed or "read" by the transducer devices. It may be noted that a small negative voltage appears at base electrode 103 of transistor 100 by virtue of the alternate charging and discharging of capacitor 108 on negative and positive half cycles of the supply voltage from transformer 70. The capacitor charges through the base collector electrodes 103 and 102 of the transistor during the negative half cycle of the supply voltage, that is when the collector is negative with respect to the base, and discharges through potentiometer winding 109 provide a back bias across base-emitter electrodes 103 and 101. In other words, a threshhold is established so as to tend to prevent inadvertent energization and operation of the diverter mechanism. Curve 232 on FIG. 5 is representative of the voltage appearing on collector electrode 102 of transistor 100. Curve 233 shows the voltage appearing at collector 91 of transistor 90. Curves 234 and 235 represent the anode electrode voltage and current respectively for silicon controlled rectifier 87 when a "correct" code has been read. The current flow through load utilization means 83 may be utilized to energize, for example, a relay which in turn may be connected to the discharge station diverting apparatus control element 14 which serves to suitably position diverting member 16 to cause discharge of the article to a station represented by conveyor 15.

Under some conditions, it is desirable to operate the apparatus of FIG. 3 in a manner similar to that of FIG. 2. The addition of a third silicon controlled rectifier, connected as in FIG. 2 to the output of a transducer element corresponding to electromagnetic energy transferring device 21, connected to control the operation of rectifier 77 on FIG. 3 is one circut which will provide this type of operation.

The following is a table of values for the components utilized in FIG. 2:

| Reference character: | Value |
| --- | --- |
| 45 | General Electric type C11F silicon controlled rectifier. |
| 53 | 100 ohm resistor. |
| 54 | Type 1N19 diode. |
| 49 | General Electric type C11F silicon controlled rectifier. |
| 22 | Approximately 50 millihenries— 2,000 ampere turns. |
| 53 | 2 ohm 25 watt. |

A voltage of 32 volts R.M.S. was measured across terminals 33 and 36 of secondary winding 32, a voltage of 6.3 volts R.M.S. was measured across terminals 33 and 35 of secondary winding 32 and a voltage of .8 volt R.M.S. was measured across terminals 34 and 35 of transformer secondary winding 32. Primary winding 31 was energized from a 120 volt 60 cycle source of alternating current energy.

The following is a table of values utilized for the apparatus shown in FIG. 3.

| Reference character: | Value |
| --- | --- |
| 113 | 12,000 ohm resistor. |
| 105 | 560 ohm resistor. |
| 107 | 560 ohm resistor. |
| 109 | 100,000 ohm potentiometer. |
| 108 | .01 microfarad capacitor. |
| 409 | 1,000 ohm resistor. |
| 111 | 100 ohm resistor. |
| 97 | .01 microfarad capacitor. |
| 96 | 2,200 ohm resistor. |
| 94 | 100 ohm resistor. |
| 88 | 1,000 ohm resistor. |
| 87 | General Electric type C11F silicon controlled rectifier. |
| 90 | Type 2N1404 transistor. |
| 100 | Type 2N1302 transistor. |
| 114 | Type 1N191 diode. |
| 115 | Type 1N191 diode. |
| 116 | Type 1N191 diode. |
| 129 | 120 ohm resistor. |
| 422 | 1,000 ohm potentiometer. |
| 126 | 120 ohm resistor. |
| 125 | 10 ohm resistor. |
| 139 | 120 ohm resistor. |
| 137 | 1,000 ohm potentiometer. |
| 136 | 120 ohm resistor. |
| 135 | 10 ohm resistor. |
| 159 | 120 ohm resistor. |
| 157 | 1,000 ohm potentiometer. |
| 156 | 120 ohm resistor. |
| 155 | 10 ohm resistor. |
| 500 | .005 microfarad capacitor. |
| 124 | 3,300 ohm resistor. |
| 501 | 3,300 ohm resistor. |
| 134 | .005 microfarad capacitor. |
| 502 | 3,300 ohm resistor. |
| 154 | .005 microfarad capacitor. |
| 77 | General Electric type C11F silicon controlled rectifier. |

A voltage of 7.5 volts R.M.S. was observed across terminals 74 and 73 of transformer winding 72, a voltage of 7.5 volts R.M.S. was observed across terminals 75 and 76 of winding 72. Primary winding 71 was energized from a 120 volt, 60 cycle source of alternating current energy.

FIG. 10 illustrates another type of recording head which may be embodied in connection with FIGS. 1 and 2. The head 22 includes a core of ferromagnetic material which is opened at one end to provide an air gap substantially the length of one of the magnetizable tabs 19, provided on an article to be conveyed. An input winding 620 is wound around one leg of the core member and is provided with a pair of input terminals 622 and 623 for energization from a suitable source of direct current energy.

FIGS. 7, 8 and 9 illustrate a further embodiment of my invention in which an improved source of energization for the electromagnetic energy transferring devices is provided. In FIG. 8 a transformer 600 having a core constructed of material having a substantially rectangular hysteresis characteristic, or square loop material, is shown having a primary winding 601 and a secondary winding 603. A resistor 602 is connected in series with primary winding 601 to tend to limit the current applied to primary winding 601 from a suitable source of alternating current energy. As will be noted below, the source of alternating current energy may be adjustable. Secondary winding 603 on transformer 600 is connected to a primary winding 611 on an output transformer 610 which is constructed with a core of non-saturating ferromagnetic material. The upper end of secondary winding 603 is connected to the upper end of primary winding 611 through conductor 604 and a current limiting resistor 605. An asymmetrical current conducting device, 607, may be inserted in series with resistor 605. The lower ends of the two transformer windings are connected through conductor 606. The output of transformer 610 appears across secondary winding 612.

In FIG. 9 there is shown a representative hysteresis curve of the B–H characteristics of square loop core material. Extending downwardly from the vertical axis of the set of coordinates upon which the curve is sketched, is a curve showing a cycle of a sine wave and as might be supplied from a commercially available source of alternating current energy. Extending to the right of the hysteresis curve is another set of curves showing a series of pulses which represent the output appearing across the secondary winding of transformers 600 and 610. It will be noted that the length of the pulses appearing at the right of the hysteresis curve is dependent upon the magnitude of input voltage at which the core material saturates. The reference characters T1 and T2 correspond to the same time on each of the input and output curves. For the initial period from 0 to T1, the core material behaves as in the usual manner. However after saturation is reached, the output drops to zero and continues from T1 to time $\pi/w$. The trailing edge of the pulse has a slope determined by the inductance of transformer 610, which is representative of the electromagnetic energy transferring devices utilized in the reader described above. The slope of the trailing edge of the pulse has an effect on the output of the electro-magnetic energy transferring devices which has been observed to increase with an increase in slope. The core remains saturated until the input voltage reverses in the opposite direction and an output pulse, of opposite polarity, is observed during the time interval from $\pi/w$ to T2 when the core again saturates in the opposite direction. Thus it may be seen that a pulse is generated each time the input voltage crosses the zero axis and continues for a time dependent upon the time it takes the input voltage to reach a value at which saturation of the core occurs. Therefore by varying the amplitude of the input voltage, within predetermined limits, the length of the output pulses may be varied over substantially half of the time of one-half cycle of input voltage.

Referring to FIG. 7, a pair of transformers 450 and 460 are shown in energizing relationship to a pair of electromagnetic energy transferring devices 470 and 490. The output of the electromagnetic energy transferring devices is applied through an amplifying means to an output utilization means 570. Transformer 460, indicated as having a saturable core of substantially rectangular hysteresis characteristics includes a primary winding 461 adapted for connection to a suitable source of alternating current energy through conductors 462 and 463 and a secondary winding 464 connected to conductors 465 and 467. The relative polarities of the primary and secondary windings are as indicated by the markings in proximity to each winding. Transformer 450 includes a primary winding 451 connected to conductors 462 and 463 through conductors 453 and 452 respectively and a center tapped secondary winding having a pair of terminals 457 and 458 and a center tap 456. The relative polarities of the windings on transformer 450 are indicated by the polarity markings in proximity thereto. A diode 468 serves to connect conductor 465 to conductor 469. Input winding 472 on electromagnetic energy transferring device 470 is connected intermediate conductors 469 and 467 through resistor 473. Input winding 492 and resistor 493 are connected in series intermediate conductors 469 and 467. A voltage dividing network including resistor 482, potentiometer winding 480, having potentiometer wiper 481 associated therewith, and resistor 483 is connected intermediate terminal 458 and terminal 484 on conductor 559. A compensating winding 471 is connected intermediate wiper 481 and terminal 555 on conductor 558. A voltage dividing network including resistor 552, potentiometer winding 550 having wiper 551 associated therewith, and resistor 553 is connected intermediate conductor 559 and terminal 556 on conductor 557. Compensating winding 491 is connected intermediate wiper 551 and conductor 558 through conductor 554. Output windings 474 and 494 are connected to stationary contacts on double-pole, double-throw switch means 475 and 495 respectively. Switch means 475 is adapted with intercrossing connections 477 and 478 between the stationary contacts to provide reversing operation of the output of winding 474. In like manner, stationary contacts on switch means 495 are connected through intercrossing 497 and 498. The lower movable contacts on switches 475 and 495 are both connected to terminal 556 on conductor 557. The upper terminal on movable contacts 476 is connected to terminal 565 on conductor 564 through conductor 560 and asymmetrical current conducting device 563. The upper terminal on movable contacts 496 is connected to terminal 565 through conductor 561, asymmetrical current conducting device 562 and conductor 564. Terminal 565 is connected to terminal 457 on transformer secondary winding 455 through resistor 566 and terminal 567. Conductor 568 is connected to terminal 567 and to output means 570. The operations and connections of transistors 590, 580 and silicon control rectifier 572 is the same as that shown and described for FIG. 3 and therefore will not be repeated here.

The use of the saturable core transformer as a source of pulses for energizing the electromagnetic energy transferring devices provides an uncomplicated economical manner of achieving energization while remaining substantially insensitive to variations in operating characteristics, for example, extreme changes in ambient temperature.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described, article encoding apparatus comprising; a source of low frequency alternating current energy; a plurality of electromagnetic energy transferring devices; first and second current controlling devices, each having input and output terminals; circuit means connecting one of said electromagnetic energy transferring devices and the output terminals of said first current controlling device to said source of energy; further circuit means connecting the input terminals of said first current controlling device to said source of energy; circuit means connecting the remainder of said electromagnetic energy transferring devices and the output terminals of said second current controlling device to said source of energy; and circuit means connecting said one of said electromagnetic energy transferring devices to the input terminals of said second current controlling device.

2. In apparatus of the class above described, article encoding apparatus comprising; a source of low frequency alternating current energy; a first electromagnetic energy transferring device having input and output terminals, a further plurality of electromagnetic energy transferring devices each having a pair of input terminals, first and second variable current asymmetrical controlling devices, each having input and output terminals; circuit means connecting the input terminals on said first energy transferring device and the output terminals of said first current controlling device to said source of alternating current; further circuit means connecting the input terminals of said first current controlling device to said source of energy; circuit means connecting the input terminals of said plurality of energy transferring devices and the output terminals of said second current controlling device to said source of energy; and circuit means connecting the output terminals of first energy transferring device to the input terminals of said second current controlling device.

3. The apparatus of claim 2 in which said first energy transferring device includes a further pair of input terminals connected to said source of alternating energy through means for varying the magnitude and phase of the energy supplied to said further pair of input terminals.

4. In apparatus of the class above described; article encoding apparatus comprising; a source of alternating current energy; a plurality of electromagnetic energy transferring devices; first and second asymmetrical current controlling devices, each having input and output terminals; circuit means connecting one of said electromagnetic energy transferring devices and the output terminals of said first current controlling device to said source of alternating current; further circuit means for variably connecting the input terminals of said first current controlling device to said source of energy whereby said current controlling device is conductive during a predetermined portion of alternate half cycles of said source of energy; circuit means connecting the remainder of said electromagnetic energy transferring devices and the output terminals of said second current controlling device to said source of energy; and circuit means variably connecting said one of said electromagnetic energy transferring devices to the input terminals of said second current controlling device.

5. In apparatus of the class above described, article detecting apparatus comprising; a source of low frequency alternating current energy; a plurality of electromagnetic energy transferring devices each having input and output terminals; first and second current controlling devices each having input and output terminals; circuit means connecting the output terminals of said first current controlling device and the input terminals of each of said plurality of energy transferring devices to said source of energy; circuit means connecting the output terminals of said energy transferring devices to said source of energy; further circuit means connecting the output terminals of said energy transferring devices to the input terminals of said second current controlling device; and circuit means connecting a load means and the output terminals of said second current controlling device to said source of energy.

6. The apparatus of claim 5 in which said further circuit means comprises an AND gate.

7. The apparatus of claim 5 in which said energy transferring devices include a further pair of input terminals and said input terminals are connected to said source of energy through variable circuit means for varying the magnitude and phase of said alternating energy.

8. The apparatus of claim 5 in which said first current controlling device is a saturable core transformer.

9. In apparatus of the class above described, article detecting apparatus comprising; a source of low frequency alternating current energy; a plurality of electromagnetic energy transferring devices each having input and output terminals; first and second asymmetrical current controlling devices each having input and output terminals; circuit means connecting the input terminals of said first current controlling device to said source of energy; circuit means connecting the output terminals of said first current controlling device and the input terminals of each of said plurality of energy transferring devices to said source of energy; circuit means connecting the output terminals of said energy transferring devices to said source of energy; circuit means connecting the output terminals of said energy transferring devices to the input terminals of said second current controlling device so that similar outputs from all of said plurality of energy transferring devices are applied thereto upon coincidence of said plurality of devices with a like plurality of polarized ferromagnetic recording members; and circuit means connecting a load means and the output terminals of said second current controlling device to said source of energy.

10. The apparatus of claim 9 in which said first and second asymmetrical current controlling devices are silicon controlled rectifiers.

11. In apparatus of the class above described, article detecting apparatus comprising; a source of low frequency alternating current energy; a plurality of electromagnetic energy transferring devices each having input and output terminals; means for detecting coincidence between said energy transferring devices and a like plurality of pre-recorded sources of magnetic flux signal; first and second asymmetrical current controlling devices each having input and output terminals; circuit means connecting the input terminals of said first current controlling device to said source of energy so that said device is conductive for a predetermined portion of alternate like half cycles of energization; circuit means connecting the output terminals of said first current controlling device and the input terminals of each of said plurality of energy transferring devices to said source of energy; circuit means connecting the output terminals of said energy transferring devices to said source of energy; circuit means connecting the output terminals of said energy transferring devices to the input terminals of said second current controlling device; and circuit means connecting a load means and the output terminals of said second current controlling device to said source of energy.

12. The method of reading a magnetic recording on a plurality of ferromagnetic elements which comprises; sensing coincidence of a plurality of recorded areas with a like plurality of electromagnetic energy transferring devices; energizing said energy transferring devices with predetermined portions of like half cycles from a source of alternating current energy; and combining the output of said energy transferring devices so that simultaneous like output indicate a correct reading.

13. In a flux type electromagnetic energy transferring device the method of compensating for variations in ambient magnetic field intensity which comprises; energizing the primary winding of an electromagnetic energy transferring device with a periodic current of predetermined frequency, applying an adjustable source of alternating magnetic flux at said frequency to the magnetic circuit of said primary winding and varying the phase and amplitude of said source of flux while observing the output of the secondary winding for a minimum output.

References Cited by the Examiner

UNITED STATES PATENTS

| | | | |
|---|---|---|---|
| 2,734,186 | 2/1956 | Williams | 340—174.1 |
| 2,785,038 | 3/1957 | Ferber | 346—74 |
| 2,857,585 | 10/1958 | Dickinson | 340—174.1 |
| 2,986,264 | 5/1961 | Holben | 198—38 |
| 3,015,533 | 1/1962 | Anderson | 346—74 |
| 3,019,883 | 2/1962 | Jones | 198—38 |
| 3,075,653 | 1/1963 | Wales et al. | 198—38 X |

BERNARD KONICK, *Primary Examiner.*

IRVING L. SRAGOW, *Examiner.*

R. M. JENNINGS, A. I. NEUSTADT,
*Assistant Examiners.*